(12) United States Patent
Daniely et al.

(10) Patent No.: US 8,992,781 B2
(45) Date of Patent: Mar. 31, 2015

(54) WATER FILTER-PITCHER

(75) Inventors: Guy Daniely, Jerusalem (IL); Avraham Cohen, Jerusalem (IL)

(73) Assignee: Soda-Club (CO2) SA, Zug (CH)

( * ) Notice: Subject to any disclaimer, the term of this patent is extended or adjusted under 35 U.S.C. 154(b) by 587 days.

(21) Appl. No.: 13/375,233

(22) PCT Filed: Jun. 1, 2010

(86) PCT No.: PCT/IB2010/052441
§ 371 (c)(1),
(2), (4) Date: Jan. 23, 2012

(87) PCT Pub. No.: WO2010/140118
PCT Pub. Date: Dec. 9, 2010

(65) Prior Publication Data
US 2012/0111803 A1    May 10, 2012

(30) Foreign Application Priority Data
Jun. 1, 2009  (IL) .......................................... 199047

(51) Int. Cl.
*C02F 1/78* (2006.01)
*B01D 61/18* (2006.01)
(Continued)

(52) U.S. Cl.
CPC ................ *B01D 61/18* (2013.01); *C02F 1/003* (2013.01); *C02F 1/78* (2013.01); *B01D 61/22* (2013.01); *C02F 2201/78* (2013.01); *C02F 2307/04* (2013.01); *B01D 2311/04* (2013.01); *B01D 2311/26* (2013.01); *B01D 2313/16* (2013.01);
(Continued)

(58) Field of Classification Search
CPC ............. C02F 1/003; C02F 1/20; C02F 1/78; C02F 2201/78; C02F 2201/782; C02F 2201/784; C02F 2303/18; C02F 2307/02; C02F 2307/04; B01D 35/027; B01D 35/0276; B01D 35/30; B01D 35/306; B01D 35/34; B01D 27/08; B01D 2201/004; B01D 2201/0415; B01D 2201/0423; B01D 2221/02; B01D 2221/08
USPC ................. 210/760, 764, 192, 205, 209, 220, 210/257.1, 261, 262; 422/28, 29
See application file for complete search history.

(56) References Cited

U.S. PATENT DOCUMENTS 3,692,180 A    9/1972  Laraus
3,726,404 A *  4/1973  Troglione ..................... 210/139
(Continued)

FOREIGN PATENT DOCUMENTS

CN    1476416      2/2004
JP    02187196     7/1990
(Continued)

OTHER PUBLICATIONS

English abstract of CN 1476416 generated online on Mar. 17, 2013.
(Continued)

*Primary Examiner* — Lucas Stelling
(74) *Attorney, Agent, or Firm* — Eitan, Mehulal & Sadot

(57) ABSTRACT

A water filter-pitcher includes a water pitcher with at least two chambers separated by at least one filter, and an ozone generator to generate ozone for sanitizing at least internal surfaces of said two chambers.

21 Claims, 4 Drawing Sheets

(51) Int. Cl.
*C02F 1/00* (2006.01)
*B01D 61/22* (2006.01)

(52) U.S. Cl.
CPC ..... *B01D 2313/243* (2013.01); *B01D 2313/365* (2013.01)
USPC .......... 210/760; 210/764; 210/192; 210/205; 210/220; 210/241; 210/262; 422/28; 422/29

(56) References Cited

U.S. PATENT DOCUMENTS

| | | | |
|---|---|---|---|
| 5,911,957 A * | 6/1999 | Khatchatrian et al. ... | 422/186.07 |
| 6,561,382 B2 * | 5/2003 | Shelton .............................. | 222/1 |
| 2002/0040867 A1 | 4/2002 | Conrad | |
| 2003/0124025 A1 * | 7/2003 | Mize et al. ...................... | 422/28 |
| 2009/0039032 A1 * | 2/2009 | Patera et al. .................. | 210/760 |

FOREIGN PATENT DOCUMENTS

| | | |
|---|---|---|
| CN | 03207365 | 9/1991 |
| JP | 0595698 | 12/1993 |
| JP | 08294686 | 11/1996 |
| JP | 200552107 | 7/2005 |
| JP | 2006516930 | 7/2006 |
| WO | 02102706 | 12/2002 |
| WO | 2004063100 | 7/2004 |
| WO | WO 2004/113232 | 12/2004 |

OTHER PUBLICATIONS

International Search Report PCT/IB 10/52441 dated Nov. 22, 2010.
English abstract of JP 08294686 machine generated by JPO Website on Jan. 22, 2014.
English abstract of JP 02187196 machine generated by JPO Website on Jan. 22, 2014.
English translation of JP 0595698 machine generated by JPO Website on Jan. 21, 2014.
English abstract of JP 03207365 machine generated by JPO Website on Jan. 22, 2014.

* cited by examiner

WATER FILTER-PITCHER

CROSS-REFERENCE TO RELATED APPLICATIONS

The present application is a US National Phase of PCT Application No. PCT/IB2010/052441, filed on Jun. 1, 2010, which claims the benefit of Israeli Application 199047 filed Jun. 1, 2009. The disclosures of all these applications, including all appendixes thereof, are incorporated herein by reference.

FIELD OF THE INVENTION

The present invention relates to water filter-pitchers generally, and to sanitizing the pitcher's surfaces in particular.

BACKGROUND OF THE INVENTION

The need for clean drinking water is universal. Worldwide, poor drinking water quality is estimated to kill up to 2.5 million people annually as a direct or indirect cause of diseases.

In developed countries, water supply systems typically include built-in water treatment plants, where water is purified from harmful impurities and chlorinated in order to kill viruses and bacteria. In larger systems, where the water is distributed over a large area at considerable distance from the treatment plants and relatively lengthy water pipes are required, the disinfection process is often augmented by adding excessive amounts of chlorine to the water. Such chlorination significantly reduces the exposure to the spread of infectious diseases through the water system. However, the presence of chlorine imparts objectionable odor to water, and some chlororganic compounds are themselves detrimental to health. Therefore, even centralized tap water purification does not guarantee quality, both in terms of healthiness and consumer experience. Furthermore, even in such large water supply systems, the water is typically exposed to contamination from various harmful elements such as iron, heavy metals and their oxides, rust, pesticides, lime, etc.

One of the simplest and most widespread methods of additional water purification in domestic conditions is by filtration in "filter-pitchers". Such filter-pitchers typically provide "esthetic treatment" that improves the smell and/or taste of the water by dechlorinization, the removal of particles in the water and scale treatment with ion exchange resin. The most popular filter-pitchers are those produced by Brita, Culligan, Kenwood, and General Electric (GE). The construction of these devices tends to be very simple and typically constitutes a container separated by a partition into upper and lower parts. A cartridge-type filter is arranged in the partition. The upper part of the container is filled with water that passes through the filter into the lower part.

Present-day filters are typically multilayer; they provide increased filtration efficiency with multiple sorbent layers containing, for example, activated carbon powder and ion-exchange resin layers. The filter pores are sufficiently large to ensure a satisfactory output of around 3-5 liters of water per hour. Such filters reduce unpleasant phenomena such as chlorine odor, turbidity and yellowish color of water, metal-like flavor and/or oily surface film. Good filters also decrease water hardness to an acceptable level. During the course of normal operation, contaminating materials tend to build up in the filter; accordingly, the filters should be replaced approximately once a month. Manufacturers also typically recommend cleaning the internal walls of the pitcher during the filter replacement, i.e. once a month.

Other methods for water purification in a water pitcher are also known in the art. For example, UV light sources can be used inside a pitcher for water disinfection. PCT publication WO2007078294 discloses such a method. Ozone treatment may also be used, as disclosed in U.S. Pat. Nos. 5,900,143, 6,110,431, 6,200,473, 6,673,248, and 7,135,106.

SUMMARY OF THE INVENTION

There is provided in accordance with a preferred embodiment of the present invention, a water filter-pitcher including a water pitcher with at least two chambers separated by at least one filter, and an ozone generator to generate ozone for sanitizing at least internal surfaces of the two chambers.

Further, in accordance with a preferred embodiment of the present invention, the ozone generator is housed in a base unit onto which said water pitcher is fitted.

Still further, in accordance with a preferred embodiment of the present invention, the water pitcher includes a diffuser through which the generated ozone is passed when entering the water pitcher.

Additionally, in accordance with a preferred embodiment of the present invention, the power for the ozone generator is provided by at least one of a connection to electric mains and a battery.

Moreover, in accordance with a preferred embodiment of the present invention, the water pitcher includes an ozone release filter mounted in a cover to process ozone from the ozone generator before releasing it from the water pitcher.

Further, in accordance with a preferred embodiment of the present invention, the water filter-pitcher also includes an ozone feeder tube that is threaded to a high point within a handle of the water pitch to prevent water from the water pitcher from penetrating to the base unit via the ozone feeder tube.

Still further, in accordance with a preferred embodiment of the present invention, the ozone feeder tube includes a one way valve to prevent water from water pitcher from penetrating to the base unit via the ozone feeder tube.

Additionally, in accordance with a referred embodiment of the present invention, the water pitcher is made from an ozone-resistant material.

Moreover, in accordance with a referred embodiment of the present invention, the ozone resistant material is at least one of Teflon, stainless steel, quartz and plastic.

Further, in accordance with a referred embodiment of the present invention, the diffuser is of annular shape and is arranged along interior surfaces of said pitcher.

Still further, in accordance with a referred embodiment of the present invention, Additionally, in accordance with a referred embodiment of the present invention, the water filter-pitcher also includes a sensor to indicate when the water pitcher may not be seated on the base.

Moreover, in accordance with a referred embodiment of the present invention, the sensor is at least one of a limit switch and a capacitor with a plate located on an upper surface of the base, and another plate on a bottom of said pitcher.

Further, in accordance with a referred embodiment of the present invention, the water filter-pitcher also includes a controller to at least control processing by the ozone generator.

Still further, in accordance with a referred embodiment of the present invention, the controller includes a timer function to regulate periodic operation of said ozone generator.

Additionally, in accordance with a referred embodiment of the present invention, the timer function is configured to operate without regard to an existence of water in the water pitcher.

Moreover, in accordance with a referred embodiment of the present invention, the water filter-pitcher also includes an air pump to pump ozone from the ozone generator throughout the water pitcher.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic illustration of a novel water filter-pitcher constructed and operative in accordance with a preferred embodiment of the present invention;

Figure 1:
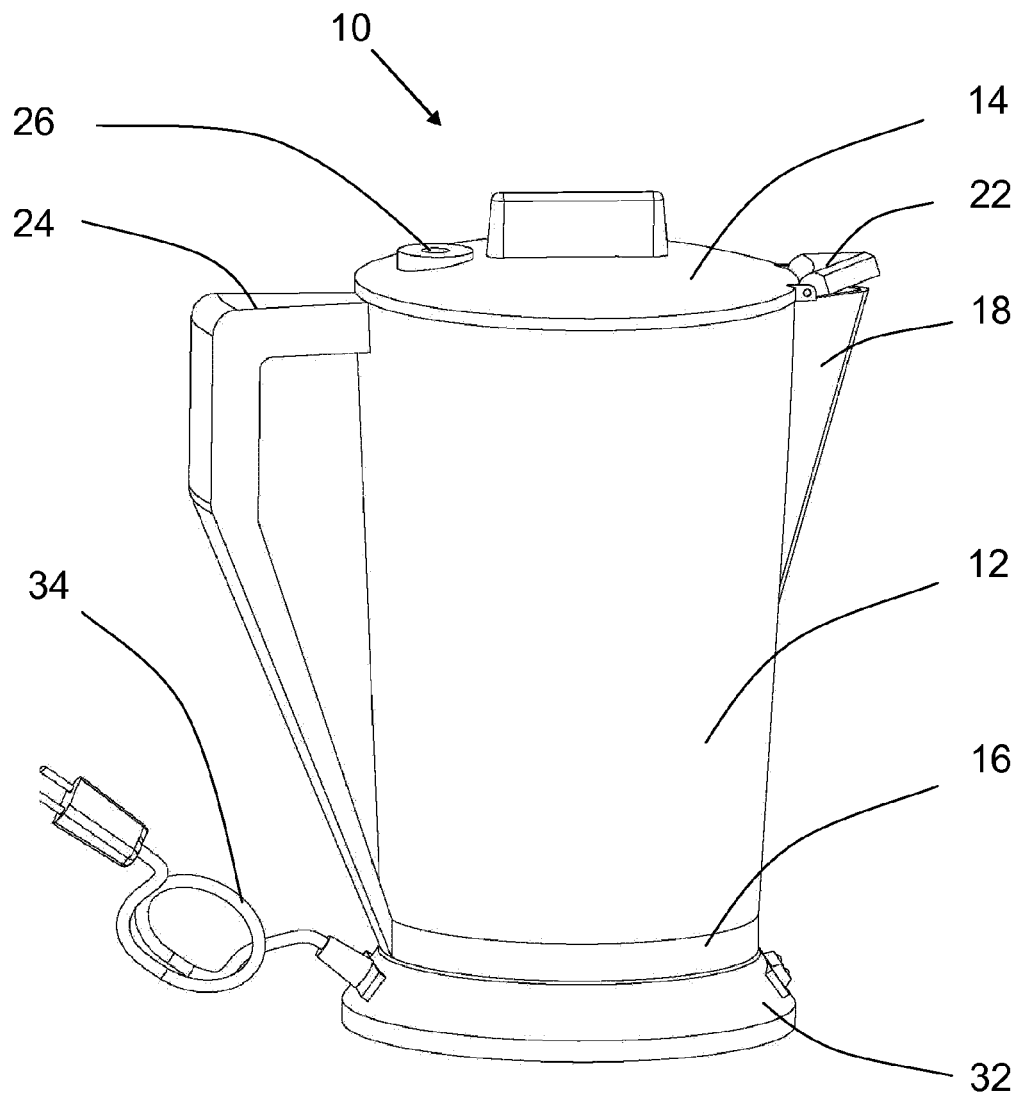
FIG. 1 is

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that even though the water in a water-pitcher may presumably have already been purified and filtered, the walls of the pitcher may be an ideal environment for bacterial colonies growth and viral reproduction. A pitcher's walls may typically be transparent or semitransparent, so that there may be sufficient light and moisture for such growth and/or reproduction inside the pitcher. Water pitchers are also often left for extended periods of time at room temperature. Under such conditions, if a small amount of bacteria get into a pitcher during cartridge replacement or washing, they may immediately start reproducing on the pitcher walls, especially in its upper areas where the presence of a certain amount of organic substances mixed in the water may be inevitable. It will be appreciated that bacterial growth on the internal surfaces of a pitcher, and by extension even inside the filter itself, may impact water quality and even make it undrinkable.

Applicants have realized that ozone treatment may be used as a generally reliable method for the sanitation of the internal surfaces of a water pitcher. Ozone may sanitize these surfaces by oxidizing pathogenic particles to which it may be exposed. Several minutes of ozone exposure per hour may be enough to prevent the appearance of bacterial colonies on the pitcher walls, irrespective of the presence of water in the pitcher. It will be appreciated that the Prior Art, as disclosed hereinabove, may consist of bulky, expensive apparatuses that may be unsuitable for implementation with filter-pitchers.

FIG. 1, to which reference is now made, illustrates a general view of a novel water filter-pitcher with ozone treatment 10, constructed and operative in accordance with a preferred embodiment of the present invention. Filter-pitcher 10 may comprise a pitcher 12 mounted on base 32, to which electric current may be supplied from domestic mains by an electric cable 34. Pitcher 12 may be constructed of an ozone resistant material such as, for example, Teflon, quartz, stainless steel and special plastics that may be developed or purchased for such purposes. Pitcher 12 may have a cover 14, bottom 16, hollow handle 24 and spout 18 with a lid 22 tightly fitted to an upper edge of spout 18. Ozone release filter 26 may be inserted into cover 14. Filter 26 may be, for example, a carbon filter.

Figure 2:
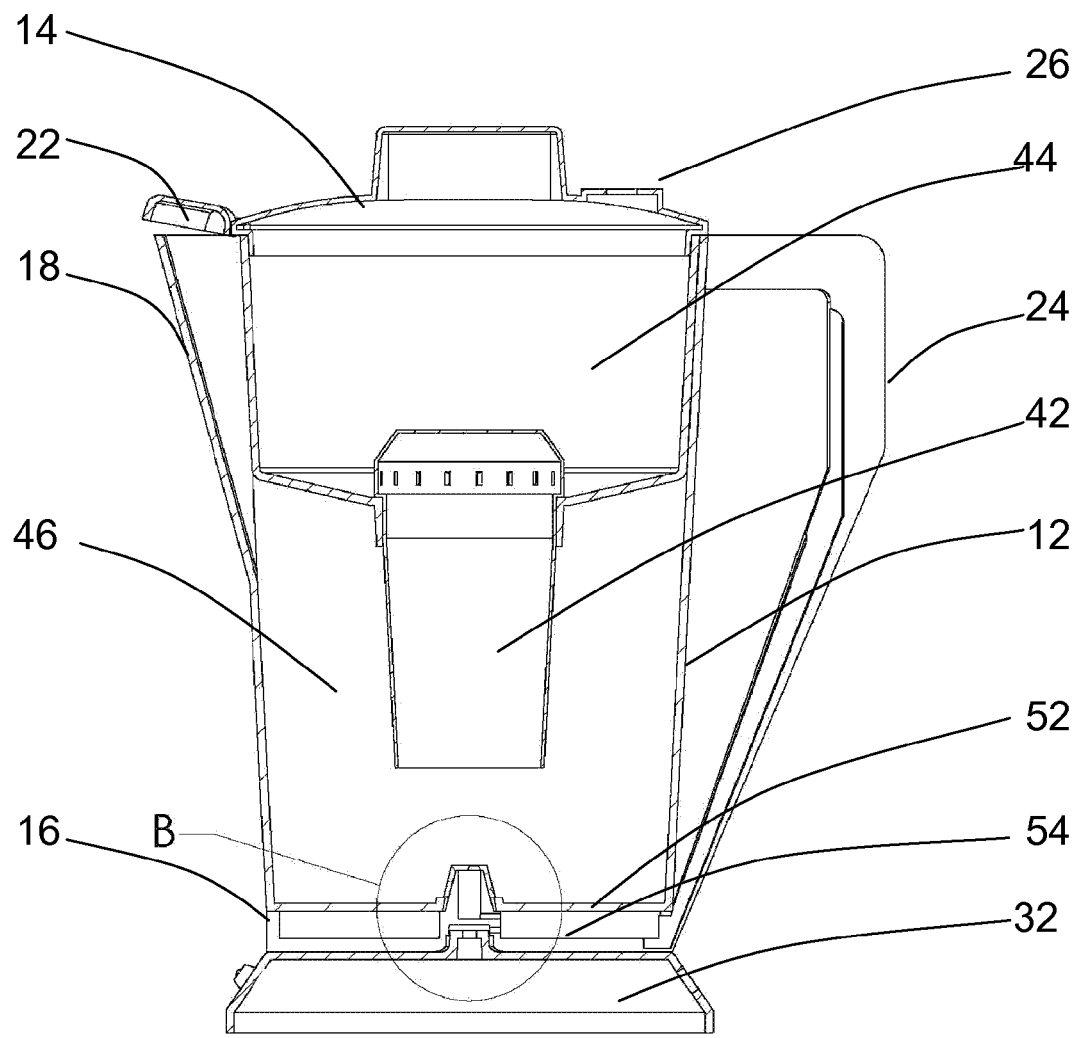
FIG. 2 is a schematic illustration of a sectional view of the water filter-pitcher of FIG. 1.

As illustrated in FIG. 2, to which reference is now also made, the inside of pitcher 12 may be subdivided into two chambers: upper chamber 44 may be filled with non-filtered tap water, and lower chamber 46 may contain filtered ready-to-use water. Water from upper chamber 44 may pass into lower chamber 46 through a standard filter 42. Bottom 16 of pitcher 12 may comprise two matching plates: upper plate 52 and a lower plate 54 which may be separated by cavity 53. Cavity 53 may conform to a cavity in handle 24. An exemplary cavity 53 may be of annular shape.

Figure 3:
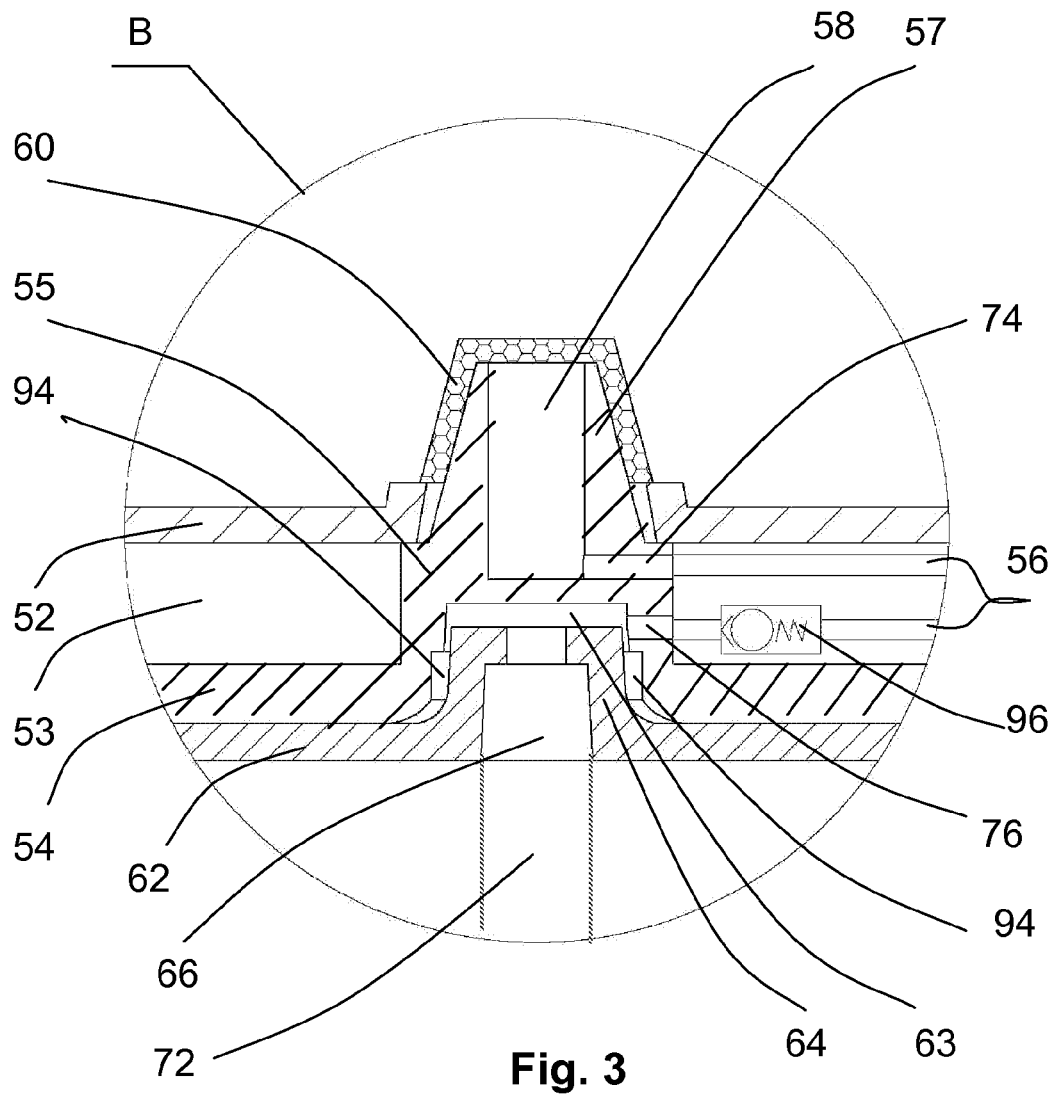
FIG. 3 is a schematic illustration of a close up view of the lower portion of FIG. 3.

Reference is now made to FIG. 3 which illustrates a close up view of the middle of bottom 16 as defined by Area B from FIG. 2. Groove 55 may extend from lower plate 54 through to protrusion 57 which may extend into lower chamber 46 (FIG. 2). Protrusion 57 may comprise a through hole 58 in it, and may be covered by a millipore diffuser 60. A protrusion 64 may be extend from base cover 62 into cavity 53 beneath protrusion 57. Clearance 63 may be generally located above protrusion 64 and beneath groove 55, and sealed by seal 94. Hole 76 may provide access from clearance 63 to the lower of tubes 56. Hole 74 may provide similar access from upper tube 56 to hole 58.

Tubes 56 may be two extensions of a single tube running throughout hollow handle 24 (FIGS. 1 and 2). The tube inside handle 24 (not shown) may extend from lower tube 56 though cavity 53, into the lowermost point of handle 24, up to the uppermost point within handle 24, and down again through upper tube 56. One way valve 96 may be located in lower tube 56 to prevent water from entering clearance 63 and eventually penetrating to base 32. Protrusion 64 may comprise a through hole 66 attached to tube 72.

Figure 4:
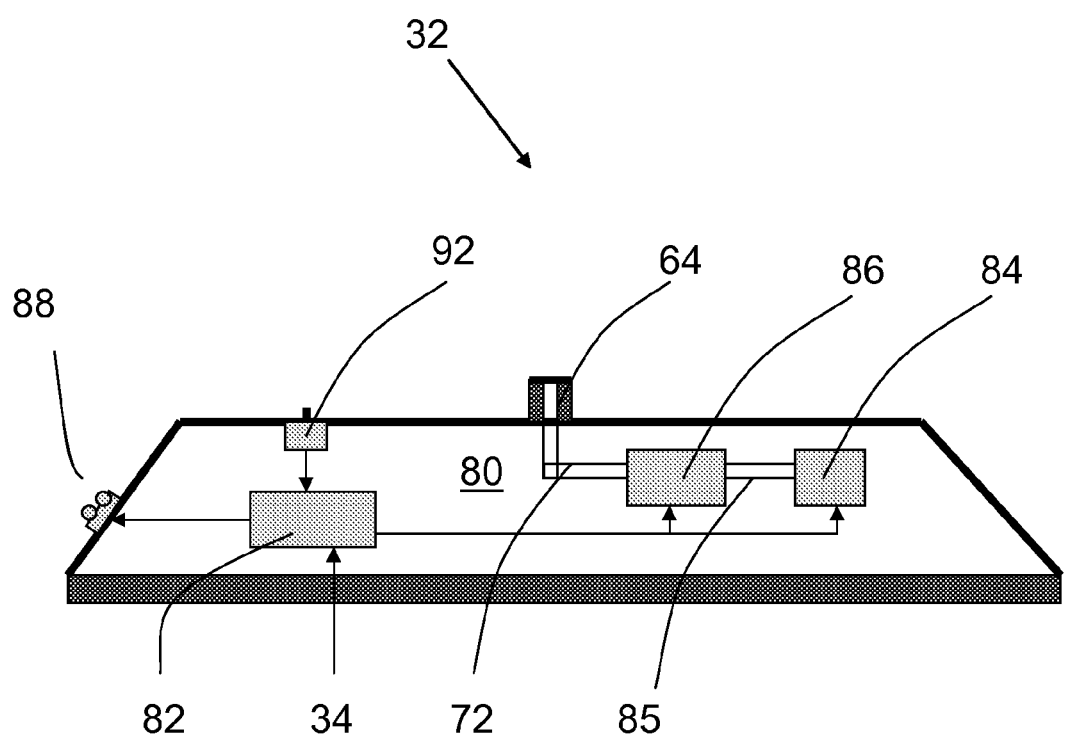
FIG. 4 is a schematic illustration of the components of the base of the water filter-pitcher of FIG. 1.

FIG. 4, to which reference is now also made, illustrates the components of base 32. Base 32 may comprise an electrical appliance 80. Appliance 80 may comprise a controller 82 to control the operation of air pump 84, an ozonator 86 and an indication unit 88. The controller may comprise a timer (not shown). Sensor 92 may be set into the upper plate of the base 32 and connected to controller 82. Sensor 92 may be implemented, for example, in the form of a limit switch, or a capacitor with one plate located on the upper surface of base 32, and another plate on the lower surface of pitcher 12. It will be appreciated that any suitable sensor may be included in the present invention.

In accordance with a preferred embodiment of the present invention, sensor 92 may be configured to detect the presence of pitcher 12 on base 32 and to forward its status to controller 82. When activated by controller 82, air pump 84 may supply air to the working chamber of the ozonator 86 via tube 85.

Ozonator 86 may use this air to generate a mixture of air and ozone. This mixture may exit ozonator 86 via tube 72 through hole 66 in protrusion 64.

It will be appreciated that the mixture of air and ozone generated by ozonator may in this manner be released throughout the various compartments of pitcher 12, including cavities 44 and 46. The mixture may be released via through tube 72, and spread throughout pitcher 12 via hole 66, clearance 63, hole 76, tube 56, hole 74, hole 58 and diffuser 60.

In accordance with a preferred embodiment of the present invention, operation of water-filter pitcher 10 may proceed as follows: When sensor 92 may detect that pitcher 12 is on base 32, sensor 92 may send an initiating signal to controller 82. Controller 82 may activate the operation of air pump 84 and ozonator 86 for a pre-defined amount of time. Controller 82 may also switch on a light on indication unit 88 to indicate that ozonation is in progress. In accordance with an exemplary embodiment of the present invention, indication unit 88 may comprise a red LED light. It will be appreciated that any suitable light or signal may also be included in the present invention.

Pump 84 may feed air to ozonator 86 via tube 85. As the air may be pumped through ozonator 86, ozone may be generated by any suitable method and/or device known in the Art, and the ensuing mixture of air and ozone may continue via tube 72 into clearance 63 between protrusion 64 and groove 55. It may then further continue to spread along a path of least resistance through hole 76 into tube 56. It will be appreciated that seal 94 may prevent ozone ingress into the environment.

The air/ozone mixture may pass from tube 56 through pipe 74 into pipe 58 and then through diffuser 60, thus entering and spreading throughout lower cavity 46 of pitcher 12. As the air/ozone mixture may spread in lower cavity 46, the ozone may sanitize its surfaces, including the lower surface of the partition between upper chamber 44 and lower chamber 46, as well as the external surface of filter 42.

The main flow of air/ozone may pass through the pores of filter 42 into upper chamber 44 of the pitcher 12. In the process, the internal surfaces of upper chamber 44, as well as the cover of filter 42, may be sanitized by the ozone. It will be appreciated that a small amount of air/ozone may also spread to the area of spout 18 and may then sanitize its internal surfaces. It will further be appreciated that air/ozone may not exit pitcher 12 via spout 18, since lid 22 may be closed.

Pitcher cover 14 may comprise ozone release filter 26. Under the action of excess pressure created by the pump 84, air/ozone may eventually pass through filter 26 before venting outside of pitcher 12. Filter 26 may act upon the air/ozone mixture such that the ozone may decompose and oxygen-enriched air may be released into the external environment. It will be appreciated that ozone is relatively unstable and may therefore be expected to deteriorate relatively quickly.

Pump 84 may continue pumping until the timer may indicate that sufficient time may have passed. Controller 82 may then turn off air pump 84 and ozonator 86. Indication unit 88 may be instructed to indicate that the ozonation process may have completed. In accordance with an exemplary embodiment of the present invention, indication unit 88 may use a green LED light to indicate this status. It will be appreciated that any other suitable indication may also be included in the present invention. Ozonator 86 may be activated at periodic intervals to attain and maintain a desired level of sanitation. It will therefore be appreciated that the present invention may provide both sanitization and the continuing suppression of pathogenic growth inside of pitcher 12.

It will be appreciated that pouring water out from a closed pitcher may expose the remaining water to possible contamination. However, when a user may remove pitcher 12 from base 32 and tilt it in order to pour some water, and a small amount of ozone that may have been trapped in spout 18 since the previous treatment may be released along with the water when lid 22 is opened. Accordingly, the perceived quality of the water may be enhanced by the presence of the ozone, while an additional measure of sanitization may be provided to the exposed area of spout 18.

It will be appreciated that since base 32 comprises electrical components and is connected to an electrical power supply, exposure to water must be prevented. Accordingly, pitcher 12 may comprise safeguards to prevent penetration of water from lower chamber 46 to base 32 during the filling of upper chamber 44 and when pouring water from pitcher 12. Tube 56 may extend to the highest part of handle 24, such that its highest section may be higher than the maximum level of water in pitcher 12. Accordingly, tube 56 may tend to have an air/ozone bubble blocking penetration of water via tube 56 to base 32. Furthermore, one-way valve 96 in the lower part of pipe 56 may prevent further penetration of any liquids that may have advanced past the bubble when pitcher 12 may be tilted in various directions while in use.

It will be appreciated that the ozonation process may not be performed when pitcher 12 may be disconnected from base 32. Sensor 92 may send a signal to controller 82 to prevent activation of pump 84 and ozonator 86 if pitcher 12 may not be in contact with base 32. It will also be appreciated that water-filter pitcher may be configured to continue periodic ozone treatments regardless of the level/presence of water in pitcher 12. Ozone treatment of pitcher 12 may be performed irrespective of the presence of water in it. In accordance with a preferred exemplary embodiment of the present invention, it may be sufficient to employ an ozonator 86 producing 50-150 mg of ozone per hour for 1-3 minutes per hour to maintain a desired level of sanitation. It will be appreciated that different configuration settings may be defined as a function of the expected level of purity of the water as it may be entered into the environment of filter-pitcher 10. In general, the lower the expected quality of the water, the longer and/or more frequent the ozone sanitization treatments may be. in any case, it will be appreciated that the power requirements for such periodic treatments may be negligible.

It will be appreciated that the present invention may provide a desired level of sanitation even if water remains in the pitcher for relatively long periods of time such as 2-10 days. Periodic ozone treatments may prevent/reduce the growth of microbes and viruses in water, which may make it possible to maintain water quality at an admissible level.

It will also be appreciated that provision of electricity via electric cable 34 may be exemplary. In accordance with an alternative preferred embodiment, pitcher 10 may be powered by batteries. It will be appreciated that a battery powered version of pitcher 10 may provide a pathogens suppression solution for use in situations where connecting to electric mains may be impractical. For example, such a battery powered version may be used on camping trips, in countries without a comprehensive power grid and/or by military units.

It will further be appreciated that a battery powered version of pitcher 10 may be suitable for placement in a refrigerator.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A water filter-pitcher comprising:
   a water pitcher with at least an upper chamber and a lower chamber separated by at least one filter, wherein said filter is positioned to filter water as it passes from said upper chamber to said lower chamber;
   a spout for pouring said water, said spout extending from said lower chamber;
   an ozone generator to generate ozone to be introduced into at least said lower chamber and said spout for sanitizing at least internal surfaces of said lower chamber and said spout and
   an ozone feeder tube that is threaded to a high point within a handle of said water pitcher to prevent water from said water pitcher from penetrating to a base unit via said ozone feeder tube, wherein said high point is higher than an expected level of water in said lower chamber and wherein said ozone feeder tube comprises a one way valve to prevent water from said water pitcher from penetrating to said base unit via said ozone feeder tube.

2. The water filter-pitcher according to claim 1 and wherein said ozone generator is housed in said base unit onto which said water pitcher is fitted.

3. The water filter-pitcher according to claim 1 and also comprising: a diffuser positioned within said lower chamber to diffuse said generated ozone throughout at least said lower chamber and said spout.

4. The water filter-pitcher according to claim 1 and wherein power for said ozone generator is provided by at least one of a connection to electric mains and a battery.

5. The water filter-pitcher according to claim 1 and wherein said water pitcher comprises an ozone release filter mounted in a cover to process ozone from said ozone generator before releasing it from said water pitcher.

6. The water filter-pitcher according to claim 1, wherein said water pitcher is made from an ozone-resistant material.

7. The water filter-pitcher according to claim 1 and wherein said ozone resistant material is at least one of: Teflon, stainless steel, quartz and plastic.

8. The water filter-pitcher according to claim 3 and wherein said diffuser is of annular shape and is arranged along interior surfaces of said pitcher.

9. The water filter-pitcher according to claim 2 also comprising a sensor to indicate when said water pitcher may not be seated on said base.

10. The water filter-pitcher according to claim 9 and wherein said sensor is at least one of a limit switch and a capacitor with a plate located on an upper surface of said base, and another plate on a bottom of said pitcher.

11. The water filter-pitcher according to claim 1 and also comprising a controller to at least control processing by said ozone generator.

12. The water filter-pitcher according to claim 11 and wherein said controller comprises a timer function to regulate periodic operation of said ozone generator.

13. The water filter-pitcher according to claim 12 and wherein said timer function is configured to operate without regard to an existence of water in said water pitcher.

14. The water filter-pitcher according to claim 1 and also comprising an air pump to pump air through said ozone generator to generate ozone to be forced throughout at least said lower chamber and said spout by said pumped air.

15. The water filter-pitcher according to claim 14 and wherein said air pump is configured to provide sufficient air pressure to force said ozone into said filter.

16. The water filter-pitcher according to claim 3 and wherein said diffuser is positioned to diffuse said ozone through water to sanitize said water when said lower chamber contains said water.

17. A method for improving water quality in a water filter-pitcher, the method comprising:
   diffusing ozone inside of said filter-pitcher to at least sanitize inner surfaces of a lower chamber for storing water and inner surfaces of a spout extending from said lower chamber; and
   wherein said diffusing also comprises providing said ozone from a base unit on which said filter-pitcher is seated during operation and wherein said providing also comprises conveying said ozone to said lower chamber via a tube threaded through a handle of said filter-pitcher, wherein a high point of said tube is higher than a level of water in said lower chamber.

18. The method according to claim 17 and also comprising filtering water from an upper chamber via a filter separating said upper chamber and said lower chamber.

19. The method according to claim 18 and wherein said diffusing also comprises diffusing said ozone via said filter to at least sanitize said filter.

20. The method according to claim 17 and wherein said diffusing also sanitizes said stored water.

21. The method according to claim 17 and wherein said lower chamber does not contain water during said diffusing.

* * * * *

UNITED STATES PATENT AND TRADEMARK OFFICE
CERTIFICATE OF CORRECTION

| | | |
|---|---|---|
| PATENT NO. | : 8,992,781 B2 | Page 1 of 1 |
| APPLICATION NO. | : 13/375233 | |
| DATED | : March 31, 2015 | |
| INVENTOR(S) | : Guy Danieli and Avraham Cohen | |

It is certified that error appears in the above-identified patent and that said Letters Patent is hereby corrected as shown below:

On the Title Page, Item (12) and Item (75)

In the Inventor data printed on the patent, the first inventor's last name should be spelled with an "i" at the end rather than a "y", as follows:

"Guy Danieli, Jerusalem (IL)"

Signed and Sealed this
Twenty-ninth Day of December, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,992,781 B2 | Page 1 of 1 |
| APPLICATION NO. | : 13/375233 | |
| DATED | : March 31, 2015 | |
| INVENTOR(S) | : Guy Danieli | |

It is certified that error appears in the above-identified patent and that said Letters Patent is hereby corrected as shown below:

On the Title Page, Item (12) and Item (75) should read

"Guy Danieli, Jerusalem (IL)"

This certificate supersedes the Certificate of Correction issued December 29, 2015.

Signed and Sealed this
Twenty-second Day of March, 2016

Michelle K. Lee
*Director of the United States Patent and Trademark Office*